(No Model.)
C. A. CHEEVER.
ELECTRO MAGNETIC DISPATCH TUBE.
No. 282,165. Patented July 31, 1883.
Fig. 1.
Fig. 2.
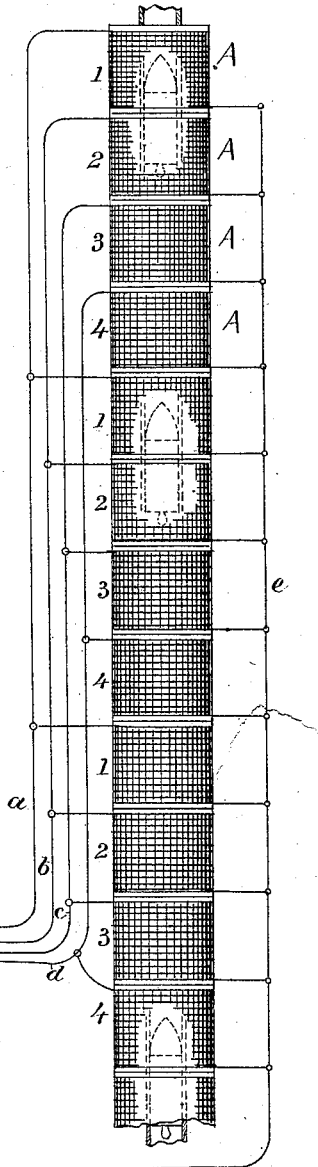
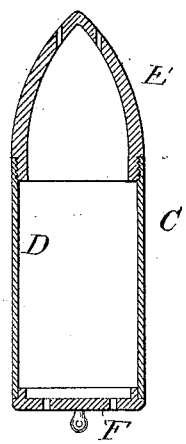
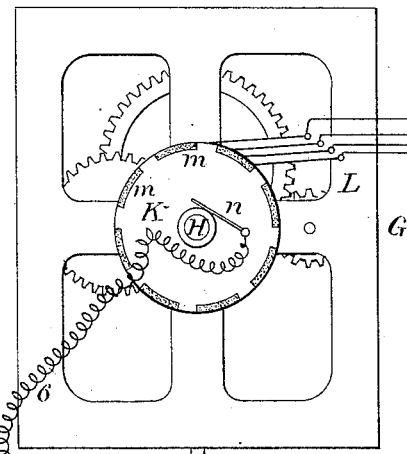
ATTEST:
INVENTOR:

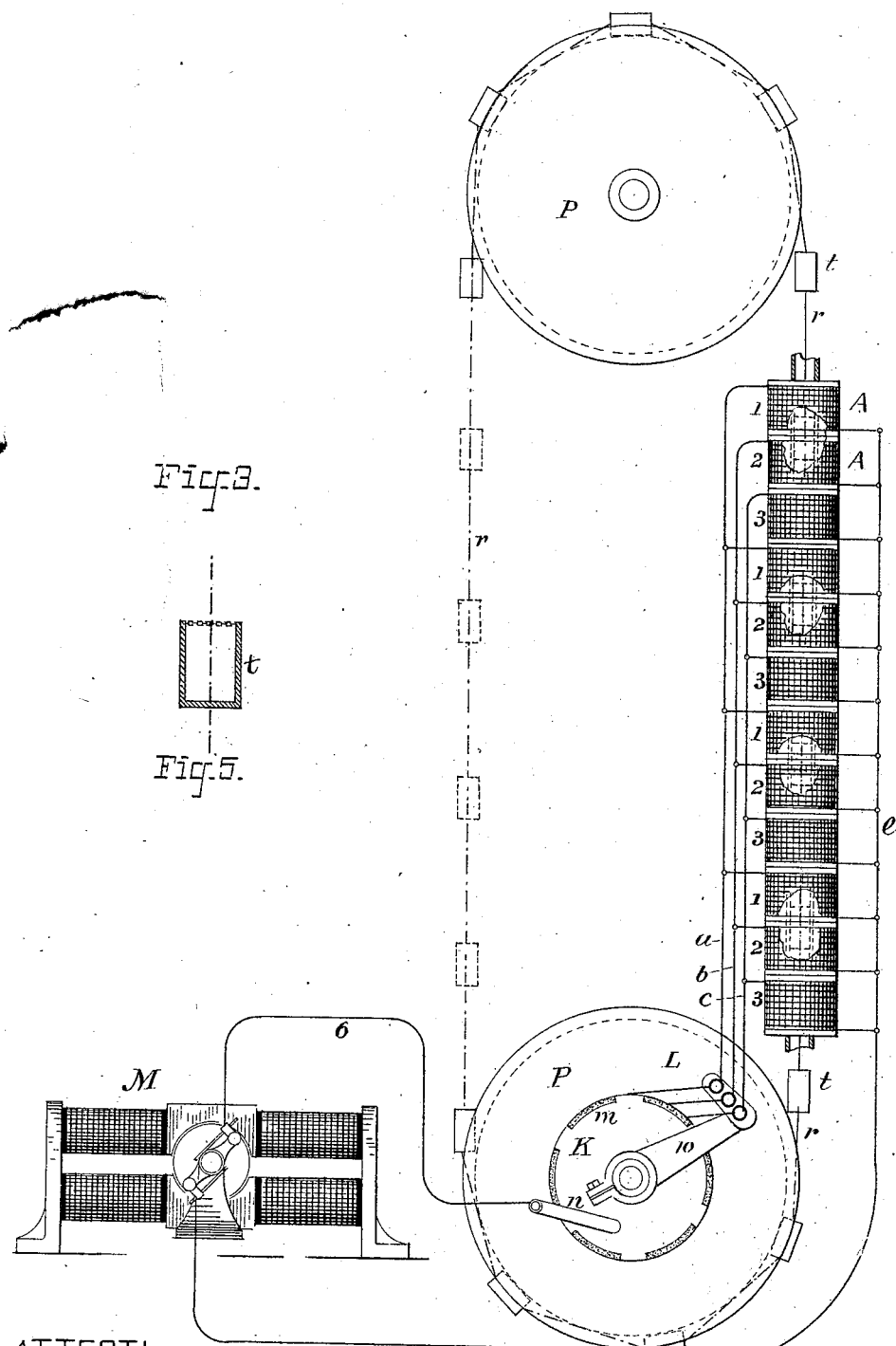

(No Model.)
C. A. CHEEVER.
ELECTRO MAGNETIC DISPATCH TUBE.
3 Sheets—Sheet 3.
No. 282,165. Patented July 31, 1883.
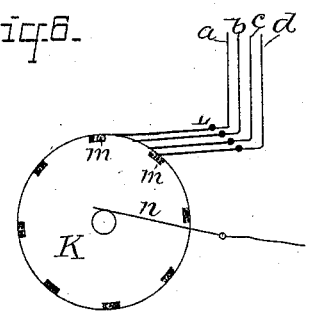
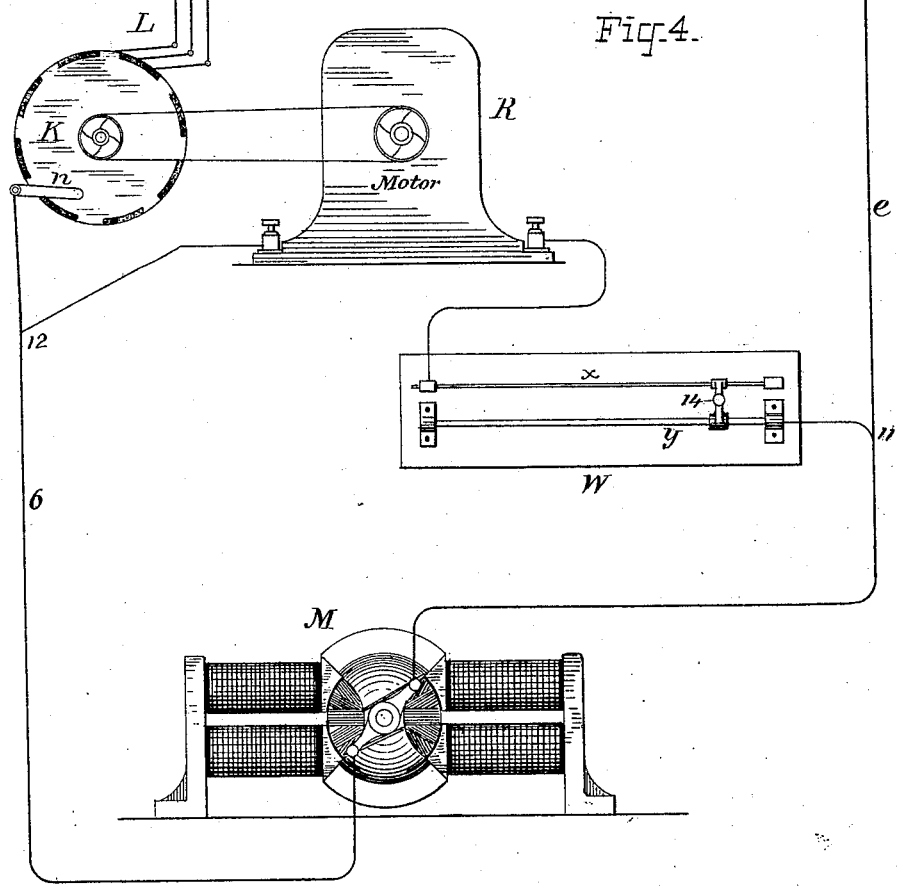
ATTEST:
INVENTOR:

UNITED STATES PATENT OFFICE.

CHARLES A. CHEEVER, OF NEW YORK, N. Y.

ELECTRO-MAGNETIC DISPATCH-TUBE.

SPECIFICATION forming part of Letters Patent No. 282,165, dated July 31, 1883.

Application filed November 6, 1882. (No model.)

*To all whom it may concern:*

Be it known that I, CHARLES A. CHEEVER, a citizen of the United States, and resident of New York, in the county of New York and State of New York, have invented certain new and useful Improvements in Electro-Magnetic Dispatch-Tubes, of which the following is a specification.

My invention relates to electro-magnetic dispatch-tubes operating upon the general principles described in patent granted to me June 20, 1880, No. 259,817. In apparatus of this class as heretofore constructed the circuit has been completed to the coils or helices singly and in succession, as the traveling carrier or vehicle moves within them, thus necessitating the employment of as many contact points or terminals as there are coils and rendering necessary the use of a multiplicity of parts. My present invention is designed as an improvement upon this class of apparatus in general, and is also designed to do away with the presence of circuit-closing or contact points or surfaces with the coils, and also upon the carrier.

My invention consists, in the first place, in dividing the coils or solenoids of the tube or guideway into two or more independent sets, symmetrically arranged, so that a coil of one set will immediately follow the coil of another set throughout the whole series, and in providing suitable circuit-controlling or current-distributing apparatus for admitting the current to the independent sets of coils in succession, the times of admission to the various sets being suitably controlled, so as to correspond with the rate of movement naturally assumed by the carrier or vehicle under the influence of the coils or solenoids.

My invention consists, further, in the combination, with the coils or solenoids of an electro-magnetic dispatch-tube, of a continuously-operating rheotome or current-director removed from the coils or solenoids, and operated by any suitable means to admit the current to the coils or solenoids at the proper times to propel the traveling carrier or vehicle.

My invention consists, also, in the combination of an endless series of connected carriers traveling within the series of coils or solenoids, and forming in effect an endless chain or band, and a current-director or rheotome exterior to said coils or solenoids and operated by said endless chain or band, so as to admit current to the coils or solenoids at times corresponding with the movement of the carriers.

My invention consists, further, in the combination, with a series of coils or solenoids divided into two or more sets, of a traveling endless series of connected carriers, and a current director or rheotome for admitting the electric current to the sets of coils in succession said rheotome being operated, preferably, by the endless series of connected carriers, or by any suitable mechanism independent of said carriers, the movements of which mechanism are suitably regulated to cause the shifting of the current from one set of coils to the next correspondently with the movement of the carriers.

My invention consists, also, in certain specified combinations, set out in the claims at the end of this specification.

In carrying my invention into practice I may divide the coils into any desired number of sets, and may arrange the rheotome and circuit-connections in such a way that any number of sets of coils less than the whole number shall be constantly in circuit, the current being changed so as to remove the sets of coils successively from the circuit. For instance, if the coils be divided into four sets, I may so arrange the connections and the rheotome that three sets shall be always in circuit, a set ahead of the three in circuit being introduced as the rear set of the three is removed, or in the same manner two of the sets may be in circuit, two others being out of circuit, and the change made in the same way by successively introducing sets ahead of the two in circuit as the rear one of the two is removed.

If desired, the commutator may be so arranged that one set only shall be in circuit at the same time, the sets being introduced singly and in succession into circuit; and I have in the accompanying drawings, Figs. 1 to 5, shown the commutator or rheotome arranged to produce this effect. I do not, however, limit myself to this particular arrangement, as it is obvious that any number of sets less than the whole number may be in circuit, the current being shifted to the sets in due order, so as to produce the required movement of the carrier.

In the accompanying drawings, Figure 1 illustrates my invention as applied to a tube or guideway in which the carriers or vehicles are disconnected, and may follow one another at various distances apart. Fig. 2 is a longitudinal section of one form of the carrier. Fig. 3 illustrates a system in which the carriers are connected together in an endless series to form an endless band, which band operates the rheotome or circuit-controlling devices. Fig. 4 shows a method of operating the rheotome by an electric current derived from the same source as that which is made to circulate in the coils or solenoids of the tube or guideway. Fig. 5 is a vertical section of one of the buckets of Fig. 3. Fig. 6 shows an arrangement of the rheotome for keeping three of four sets of coils in circuit, the current being shifted in order to the coils of the set ahead at the same time that it is withdrawn from the rear set of coils.

Referring to Fig. 1, A A A indicate a series of electro-magnetic coils or solenoids mounted or supported in any suitable manner upon a tube or guideway, B, and divided in the present instance into four independent sets, as indicated by the numerals 1, 2, 3, and 4, applied to the various coils. The coils of the various sets follow one another in the succession shown, and are each connected on the one side with a wire, $a$, $b$, $c$, or $d$, according to the set to which said coil belongs, and on the other to a common return-wire, $e$, leading to a generator. As clearly shown, the coils of set 1 are connected in multiple arc between the leading-wire or conductor $a$ and the common return-wire, while the coils of sets 2 3 4 are respectively connected in a similar manner between the leading-wires $b$ $c$ $d$ and the common return-wire.

The traveling carrier C is constructed after any desired or approved fashion. The form here shown is in substance the same as that of my prior patent before mentioned, and consists, as shown in Fig. 2, of a tubular portion, D, of iron or equivalent material capable of magnetization, or a shell or tube of any other construction capable of being drawn within the coils when a current flows in them, a conical head, E, of non-magnetic material, and a stopper, F. Any other form or construction of carrier may be used in the place of that here shown. The carrier is of proper size and length to travel in the tube B, under the influence of the coils A.

The rheotome or current-director is shown at G. It consists of any suitable propelling mechanism, (here indicated as a spring-train,) which serves to rotate a metallic disk, K, mounted on a shaft, H, of the train, and having let into its edge, pieces or strips of insulating material $m$ $m$, &c. Resting upon the edge of the disk is a series of contact-springs, L, each connected to one of the leading-wires $a$ $b$ $c$ $d$, so that, as will be obvious, said wires $a$ $b$ $c$ $d$ will be placed in succession in electrical connection with the disk, and so with the generator, by means of spring $n$, bearing on a metallic sleeve secured to the disk, and wire 6, connected to the generator. By this means the current from the generator is allowed to circulate through all of the coils of set 1 simultaneously, then simultaneously through all of the coils of set 2, the current being at the same time withdrawn from set 1, and afterward through the coils of sets 3 and 4 in the same manner, the operation being repeated eight times with every whole revolution of the disk K.

By simply increasing the length of conducting-spaces and decreasing the length of the insulating-spaces $m$ to a suitable degree two or three of the sets of coils might be kept in circuit, two or one of the sets being out. Thus it will be obvious that if the lengths of the insulating and conducting spaces, Fig. 1, be transposed, three of the sets will be in circuit, one set being out, and the current will be introduced in the same way as in Fig. 1 into the sets of coils in succession, but not singly, the difference being only that a larger number of coils or sets of coils are constantly in action, each set remaining for a relatively longer time in circuit. An arrangement adapted to produce such an action is shown in Fig. 6, and will be readily understood from what has already been said. A single carrier may be thus caused to progress from one end of the tube B to the other, or a number of such carriers may follow one another, their distances apart being equal or approximately equal to the space covered by four successive coils of the four sets.

In order to adjust the rate of change of the current from one set of coils to the next approximately to the natural rate of movement of the carrier, an adjustable pendulum-weight, $f$, upon the ordinary pendulum-rod may be used; or any other suitable device may be used for governing and adjusting the speed of the motor which drives the current-director.

The length of the conducting portions of the edge of disk K, Fig. 1, is such that contact with the springs L will be preserved, connection with neither being severed before connection is made with the succeeding one. For this purpose the length of such portion should be slightly greater than one-third of the length of the insulating portion, Where the number of sets constantly in circuit is two or more the rheotome should be similarly constructed, or adjusted to close the circuit to the set ahead at the moment before or at the instant that the rear set is withdrawn.

Other forms of rheotome or circuit-director might be used in place of that shown, provided they be properly constructed to close the circuit between the generator and the wires $a$ $b$ $c$ $d$ in succession. I do not in any way limit myself so far as this detail is concerned.

It is obvious that the coils or solenoids might be divided into a greater or less number of sets, it being perfectly practical to use any desired number of sets from two up. It is also obvious that the coils of each set might be connected in series instead of multiple arc, the one or the other method being adopted according to the character of the current supplied by the generator.

I ordinarily prefer to use a generator built for quantity or volume of current. In this case the coils are arranged in multiple arc for well-known reasons.

In Fig. 3 the carriers are shown as connected in an endless series by a cord or chain, $r$, preferably of some non-magnetizable material.

The carriers $t$ consist each of a bucket, of iron or similar magnetic material, and are placed at suitable distances apart, the whole forming an endless chain, which is made to travel within the series of coils A and over two drums or wheels, P P, suitably grooved to the size of the buckets.

The coils A are here shown as divided into three sets, and the buckets are so spaced that those which are traveling through the tube or guideway will come simultaneously within the influence of coils of the same set. As shown in the drawings, they are under the lifting or pulling influence of the coils in set No. 1.

Although the buckets are here shown as uniformly spaced, I do not limit myself to such arrangement, as it may sometimes be desirable to so arrange them that they will come within the influence of the coils at different times and will thus assist one another in passing the dead-points. Such an arrangement will avoid the tendency to a jerky or irregular movement, that might occur from subjecting the carriers simultaneously to the attractive influence of the coils at the same phase of their movement with relation to said coils. The commutator or current-director K is in this instance operated either directly or indirectly by the endless chain of buckets, the preferable manner of effecting the object being to mount the commutator directly upon the shaft of one of the drums P. In practice it would be desirable to communicate motion to the commutator from the upper drum, or the one carrying the weight of the endless chain of buckets, instead of the lower, since there would be less danger of slip and derangement of the action of the commutator in closing the circuits at the proper times. In order to allow adjustment of the commutator-springs L, so that the times of closing the circuit may be made to correspond properly with the position of the buckets, they are mounted upon an adjustable arm, 10, fixed upon the journal-bearing for the drum; or the adjustment may be effected in any other suitable manner. Any desirable form or construction of bucket may be employed.

The apparatus shown in Fig. 3 may be used as a grain-elevator, or for other purposes.

It is obvious that in Fig. 3, as in Fig. 1, the coils and rheotome might be arranged to retain three sets of coils constantly in circuit.

The current for the coils or solenoids is here shown as proceeding from a dynamo-electric machine, M. Fig. 4 shows one arrangement by which the rheotome or current-director may be operated by the dynamo-electric machine, supplying the current for the coils or solenoids, the arrangement being such that the rate of movement of the rheotome may be adjusted independently of the speed or the nature of the dynamo. In this figure R indicates an electricmotor placed in a branch circuit which is connected to the principal circuit at the points 11 12. Said motor is connected to the rheotome K by any suitable mechanical means, as a driving-band and pulley, and its speed is adjusted by means of any suitable adjustable artificial resistance, W, placed in circuit with it.

The device W, here shown, consists of a wire or strip, X, of some high-resistance material, a guide-strip, $y$, of some good conductor, and an adjustable slide, 14, resting upon both strips. Strip X is connected to the motor, and strip $y$ to the point 11 of the return-conductor. By adjusting the slide the length of resistance-wire X, included in the circuit, may be adjusted, so as to diminish or increase the speed of the motor at pleasure.

It is obvious that the rheotome might be operated by any suitable mechanical connection with the shaft of the dynamo-electric machine, suitable mechanism for changing the speed of the rheotome being interposed in said mechanical connection.

I do not limit myself to any particular construction of the details in the coils, carriers, or rheotomes, my invention consisting in the combinations of such devices, electrically arranged and related to one another in the manner herein claimed.

If desired, the rheotome may be constructed to be operated by hand. Such an arrangement is desirable on the score of economy in places where the tube is used only at intervals. By giving said rheotome one or more properly-timed revolutions after inserting the carrier said carrier may be caused to traverse the coils.

Suitable switches may be used for cutting off the current when the apparatus is not in use, and stop devices may be used with the clock-work rheotome for stopping and starting the same when desired.

What I claim as my invention is—

1. The combination, with a series of coils or solenoids surrounding the tube or guideway for an electro-magnetic dispatch-tube, and divided into two or more independent sets, of a rheotome or current-director for admitting current to the sets of coils *seriatim*, substantially as described.

2. The combination of a series of coils or solenoids, a hollow carrier or carriers made of or provided with magnetic material, and adapted to hold or carry parcels or other objects, and a continuously-operating rheotome or current-director removed from said coils for admitting current to them in the proper order, as described.

3. The combination of a series of hollow coils or solenoids, a series of hollow carriers adapted to carry parcels or other objects, and connected to one another in an endless chain or band, and a rheotome or current-director admitting current to the coils correspondingly with the movement of the carriers.

4. The combination of a series of connected electro-magnetic carriers, forming an endless chain or band, a series of coils or solenoids divided into two or more sets, within which the carriers move, and a rheotome or current-director operated by said endless band or chain for admitting the current to the sets of coils in succession.

5. The combination, with a series of connected cups or buckets, made of iron or other suitable material, of two or more sets of coils or solenoids arranged systematically, so that the coils of each set follow each the coil of another set throughout the series, supporting wheels or drums over which the series of cups or buckets travel, and a rheotome or current-director mounted upon the shaft of one of said drums and controlling the admission of current to the sets of coils in succession.

6. The combination, with the series of cups $t\ t$, &c., of iron, mounted on a chain or cord, $r$, of non-magnetic material, of the coils or solenoids A, divided into sets, the drums P P', circuit making and breaking wheel K, and the brushes L.

7. The combination of a series of buckets or receptacles formed of or provided with magnetic material and strung together in endless series, and a series of coils within which said buckets move, as and for the purpose described.

Signed at New York, in the county of New York and State of New York, this 24th day of October, A. D. 1882.

CHAS. A. CHEEVER.

Witnesses:
W. L. CANDEE,
ROBERT J. CUMMINGS, Jr.